March 11, 1958     P. ARNOLD     2,826,292
TRANSFER MECHANISM
Filed Dec. 17, 1956     4 Sheets-Sheet 1
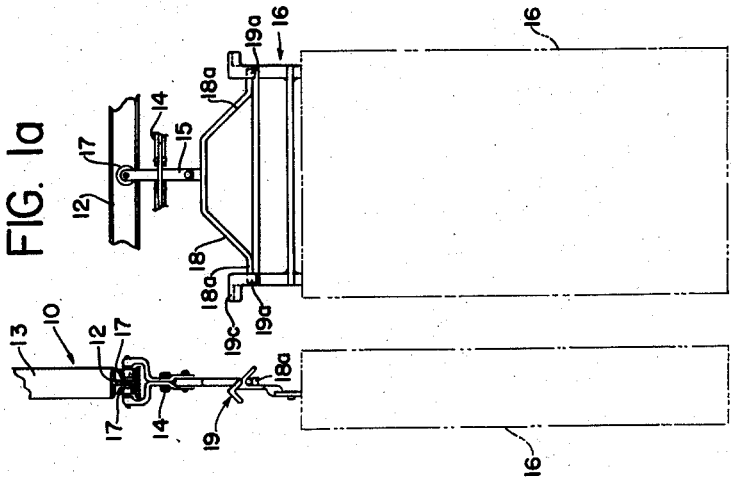
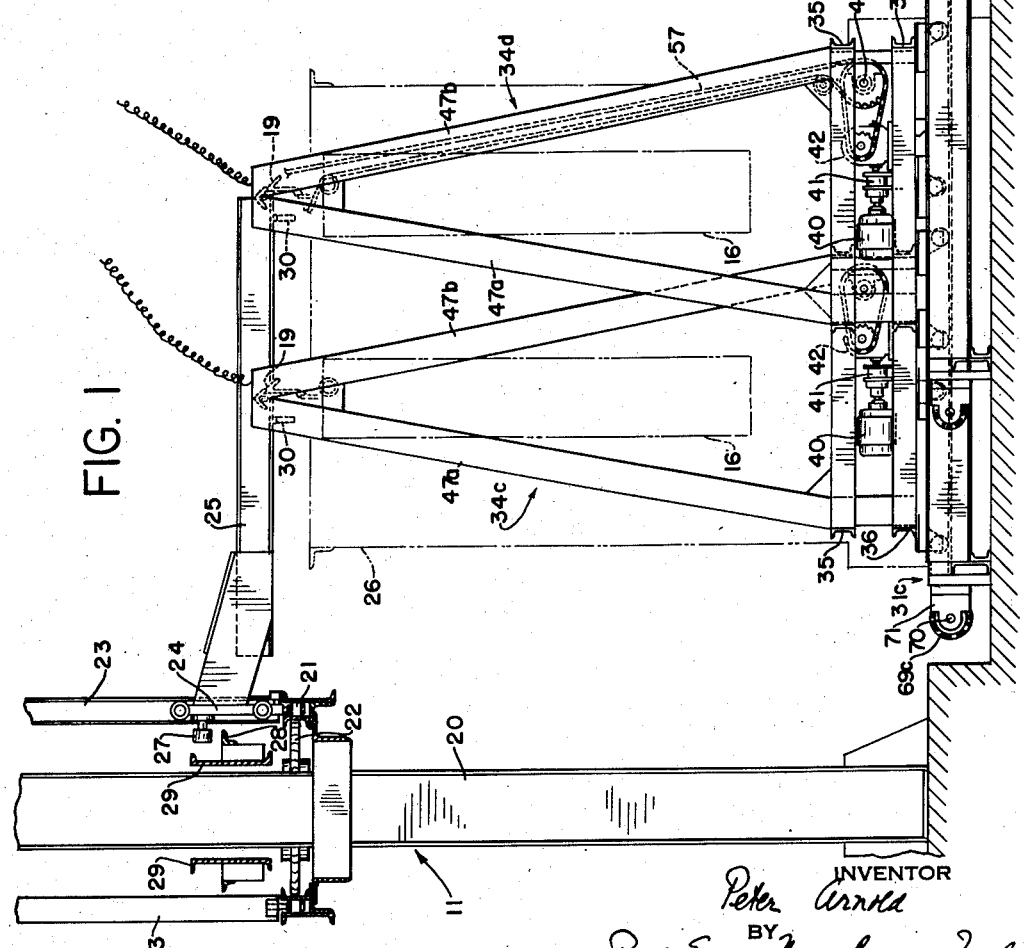
INVENTOR
Peter Arnold
BY
Pennie Edmonds Morton Barrows Taylor
ATTORNEYS March 11, 1958     P. ARNOLD     2,826,292

TRANSFER MECHANISM

Filed Dec. 17, 1956     4 Sheets-Sheet 3

INVENTOR
Peter Arnold
BY
Pennie Edmonds Morton Barrows Taylor
ATTORNEYS

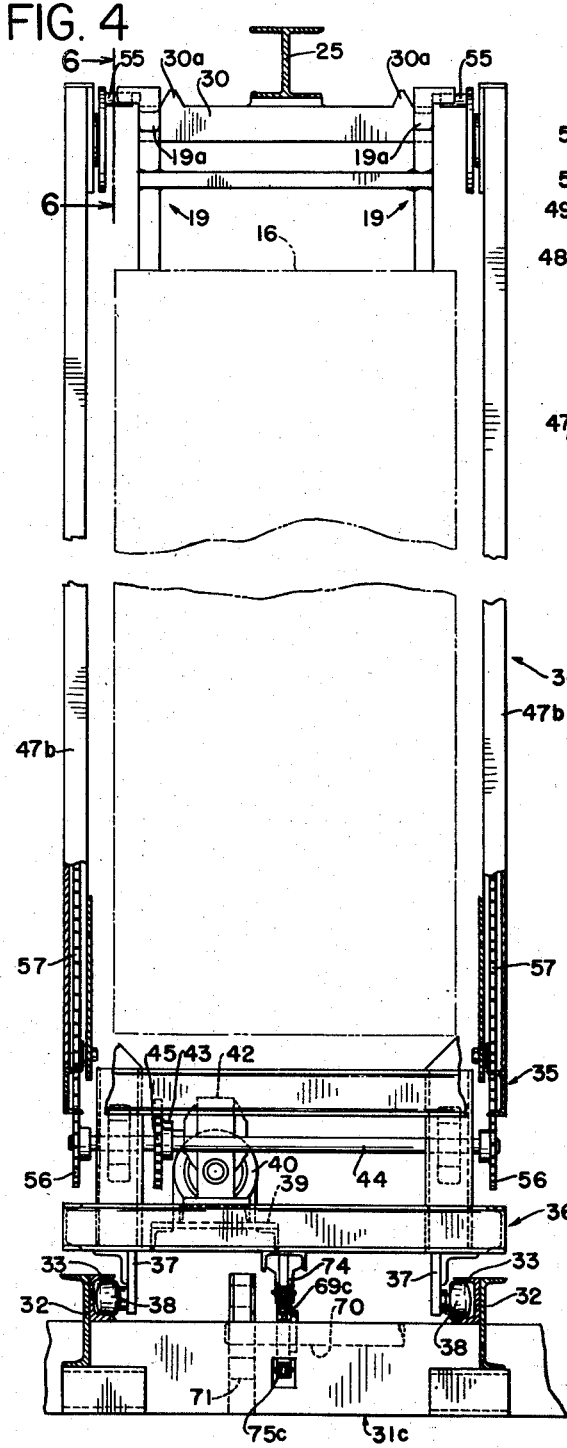

United States Patent Office 2,826,292
Patented Mar. 11, 1958

2,826,292
TRANSFER MECHANISM

Peter Arnold, Elberon, N. J., assignor to Hanson-Van Winkle-Munning Company, Matawan, N. J., a corporation of New Jersey Application December 17, 1956, Serial No. 628,713

7 Claims. (Cl. 198—177)

This invention relates to transfer mechanisms for use in connection with conveying systems for removing article carriers from one conveyor and delivering them to another. More particularly, the invention is concerned with a novel mechanism for automatically transferring article carriers between a pair of conveyors operating step-wise in timed relation with the carriers advanced in double file on one conveyor and in single file on the other. The new transfer mechanism can be employed for many purposes and is especially adapted for transferring article carriers between the conveyor of a processing machine, in which the articles are subjected to various treatments, and a plant conveyor, by which the carriers loaded with raw work are delivered to the vicinity of the processing machine and the carriers with processed articles are taken away. Typical processing machines, with which the transfer mechanism may be used, include those for electroplating, heat treatment, anodizing, etc., and, since all the advantages of the invention are realized in its use with electroplating machines, a form of the transfer mechanism for that application will be illustrated and described in detail for purposes of explanation.

Electroplating machines include a plurality of tanks containing solutions for preliminary treatments, such as cleaning, etching, etc., one or more plating tanks, and a number of tanks for finishing treatments, such as hot and reclaim rinsing. The article carriers are moved along the tanks by a conveyor operating step-wise and the carriers are raised out of each tank and lowered into the next by an elevator. One form of plating machine conveyor in common use has arms, which project over the tanks and can be raised and lowered relative to the remainder of the conveyor. The article carriers are suspended from the arms and, when the nature of the articles permits, two carriers are hung on each arm, so that the carriers advance through the machine in double file.

The plant conveyor delivering the carriers with raw work to the station where they are loaded upon the plating machine conveyor, and removing the carriers with finished articles from the station where they are unloaded from the machine conveyor, operates in timed relation to the machine conveyor and ordinarily carries the carriers in single file. The loading and unloading stations for the machine conveyor are usually adjacent and, at each station, a transfer mechanism is commonly employed for transferring the carriers between the conveyors.

The present invention is directed to the provision of a transfer mechanism functioning automatically to transfer article carriers between a pair of conveyors operating step-wise in timed relation and advancing the carriers in double file and single file, respectively. The mechanism is especially adapted for handling heavy loads and it effects the transfer thereof in a short time interval. When used between a plant conveyor and a machine conveyor, the mechanism is preferably constructed to function as a loader-unloader, which removes carriers of raw work from the plane conveyor and loads them upon the machine conveyor and simultaneously unloads carriers of finished articles from the machine conveyor and delivers them to the plant conveyor. In a form suitable for use as a loader-unloader, the mechanism includes four carriages movable along tracks extending between respective stations on the two conveyors with the tracks all terminating in the same relation to the plant conveyor. The inner tracks then extend farther beneath the machine conveyor than the outer tracks, so that the outer carriages may deliver carriers to and remove them from the outer sections of the machine conveyor arms, while the inner carriages supply carriers to and remove them from the inner sections of the arms.

For a better understanding of the invention, reference may be made to the accompanying drawings, in which Fig. 1 is a view showing one form of the transfer mechanism in side elevation and installed between a plant conveyor and a plating machine conveyor shown in section.

Fig. 1a is a view in front elevation of a trolley of the plant conveyor with an article carrier suspended therefrom;

Figure 2:
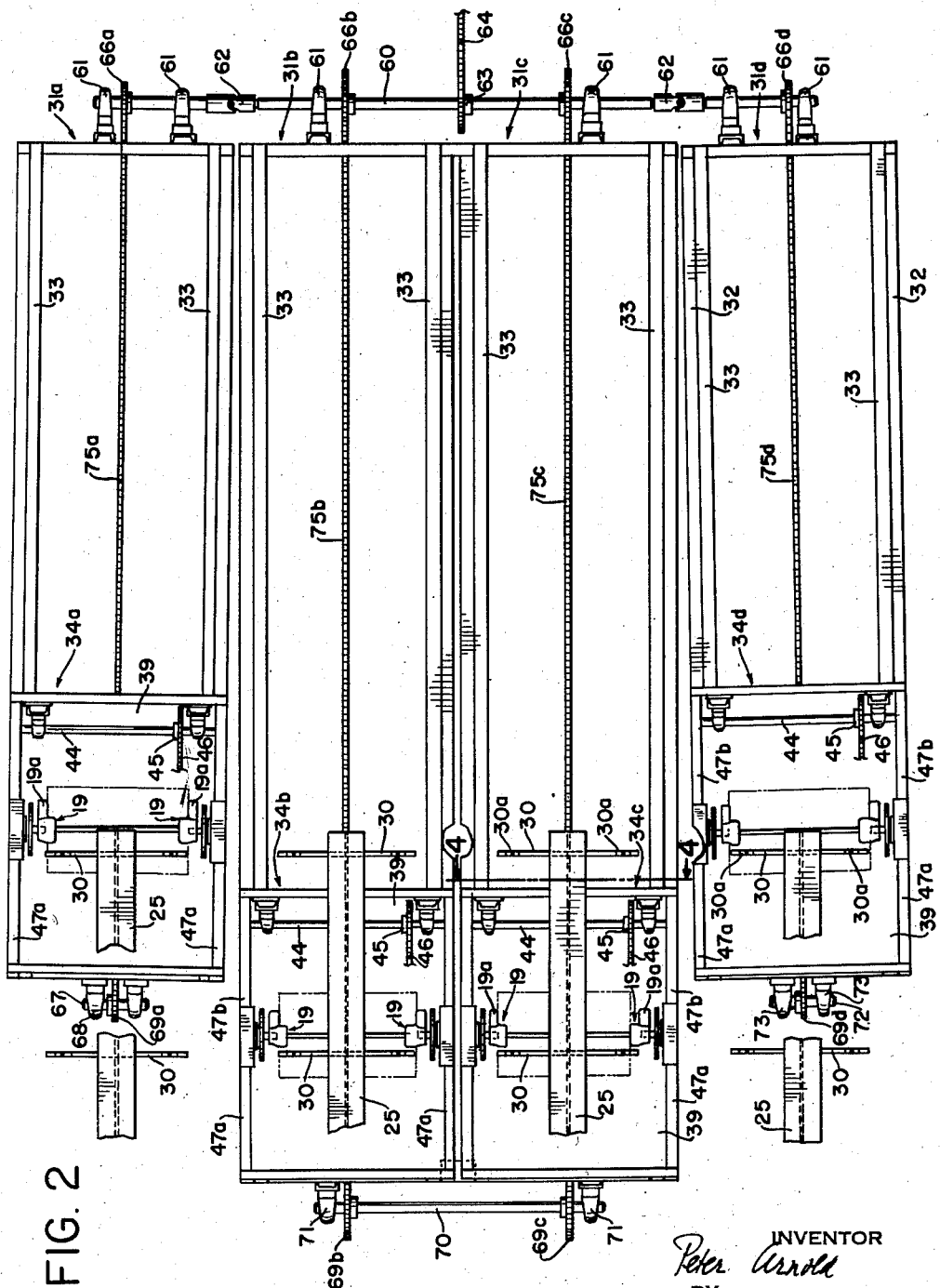
Fig. 2 is a plan view of the transfer mechanism shown in Fig. 1.
Figure 3:
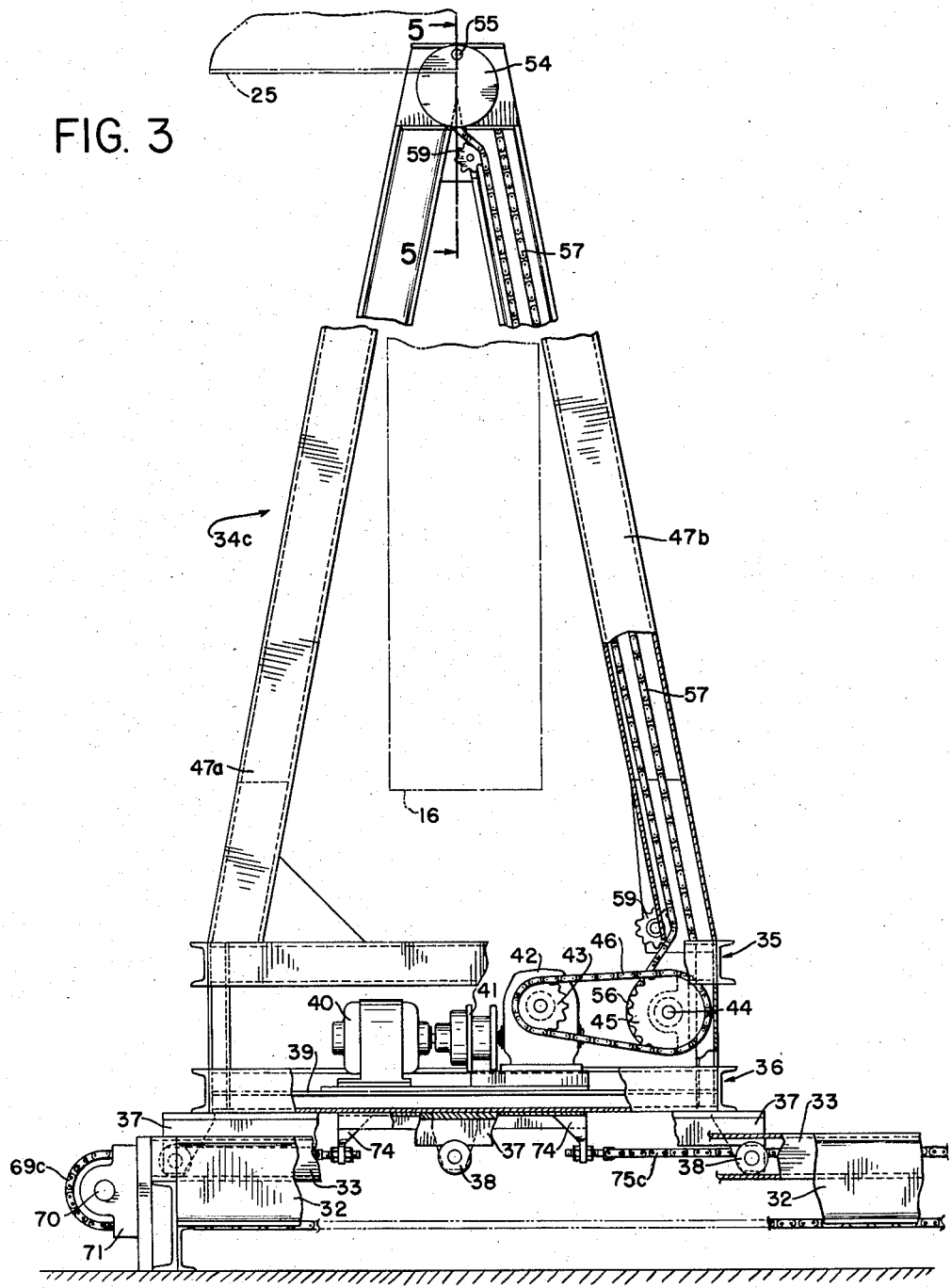
Fig. 3 is a view in side elevation on an enlarged scale and with parts broken away of one carriage of the mechanism.

Fig. 4 is a view in end elevation on an enlarged scale and with parts broken away of one of the carriages with a carrier mounted thereon, the view being on the line 4—4 of Fig. 2; and Figs. 5 and 6 are sectional views on the lines 5—5 of Fig. 3 and 6—6 of Fig. 4, respectively.

The transfer mechanism illustrated is a loader-unloader, which is disposed between a plant conveyor, generally designated 10, and the conveyor of an electroplating machine, which is indicated at 11.

The plant conveyor 10 is of the monorail type and its rail is a beam 12 suspended by hangers 13 from an overhead structure. The conveyor includes a chain 14, along which are mounted trolleys 15 or hooks for article carriers, generally designated 16, and each trolley has rollers 17 at its upper end, which rest upon the lower flange of beam 12 on opposite sides of the web of the beam and, at its lower end, the trolley has a frame 18, from which a carrier can be suspended. For this purpose, the carrier has spaced hooks 19 at its upper end and each hook has a tail 19a adapted to rest upon an end section 18a of frame 18, a forward end 19b adapted to rest upon a part of the machine conveyor, and an outward extension 19c engageable from beneath by means on the transfer mechanism.

The plating machine is illustrated as including a frame having upright structural members 20 and a conveyor movable in guideways on the frame and made up of upper and lower chains 21, of which only the lower chain is shown. The chains are trained about sprocket wheels 22 and are connected at intervals by pairs of vertical channel members 23 forming guideways for carriages 24 having arms 25, which are formed by I-beams and extend outwardly above the tanks indicated at 26. The carriages 24 are provided with pick-up rollers 27 engageable by an angle iron 28 on the beam 29 of an elevator structure, which is operable to raise and lower the carriages in their guides 23 to lift the article carriers out of and lower them into the tanks. Each conveyor arm 25 is provided with a pair of cross-bars 30, on which respective carriers 16 may be mounted with the forward ends 19b of their hooks 19 overlying the ends of the cross-bars. Each cross-bar is formed with upward projections 30a adjacent its ends to center the carrier hooks for transfer and prevent the carrier hooks from shifting and possibly becoming dislodged from the cross-bar.

The plant and plating machine conveyors move stepwise in timed relation in opposite directions and, when the plating machine conveyor comes to rest, article carriers on certain of the arms 25 thereof lie centered above tanks 26. Each such stopping point of an arm on the plating machine conveyor may be referred to as a station and, in each step of the movement of that conveyor, the arms advance by one station. The trolleys 15 on the plant conveyor are spaced a distance approximately equal to the distance between the arms on the machine conveyor and the spacing between stations of the plant conveyor is approximately the same as the spacing between stations on the machine conveyor. However, in each step in the movement of the plant conveyor, the trolleys are advanced by two stations.

The transfer mechanism includes a base made up of four sections 31a, 31b, 31c, and 31d and each section is formed of an assembly of structural members including channel members 32 extending lengthwise of the base and carrying smaller channel members 33, which face each other and form a track. The ends of the sections of the base and of the tracks thereon adjacent the plant conveyor lie in alignment, but the inner sections 31b, 31c of the base and the tracks thereon are longer than the outer sections 31a, 31d and their tracks. The tracks extend between stations on the two conveyors and the mechanism illustrated is for use with conveyors, in which the spacing between the machine conveyor stations is slightly greater than that between the plant conveyor stations. Accordingly, while sections 31b, 31c lie approximately parallel, the outer sections 31a, 31d diverge slightly toward the machine conveyor.

Carriages designated 34a, 34b, 34c, 34d are mounted on respective sections of the base and each carriage includes a base structure made up of upper and lower horizontal frames 35, 36 formed of structural members suitably secured together. A plurality of brackets 37 attached to and extending downward from the lower frames 36 carry rollers 38 entering the channels of track members 33 with certain of the rollers bearing against the lower flanges and others against the upper flanges of the channel members. A platform 39 is mounted to extend from front to rear of the lower frame 36 and a motor 40 is mounted on the platform. The shaft of the motor is connected through an electromagnetic clutch-brake device 41 to the input shaft of a speed reducer 42, the output shaft of which carries a sprocket wheel 43. A shaft 44 mounted in bearings attached to members of the base structure carries a sprocket wheel 45 connected by a chain 46 to the sprocket wheel 43.

A pair of standards 47a, 47b in the form of A-frames made of channel members are mounted to rise from the side members of the upper frame 35 of the base structure of each carriage. The standards are spaced to receive a workpiece carrier 16 between them and, at its upper ends, each frame carries a shaft 48 running in bearings 49, 50 mounted in housings 51, 52, respectively. Between the bearings, each shaft 48 carries a sprocket wheel 53 and, at its inner end beyond collar 50, each shaft carries a disc 54 provided with an eccentric pin 55. The spacing between the inner ends of the pins on the discs 54 on a carriage is such that the pins may engage the outward extensions 19c on the hooks 19 on a workpiece carrier. Each sprocket wheel 53 on a standard of a carriage is connected to a sprocket wheel 56 on the shaft 44 of the carriage by a chain 57 extending through one of the members of the standard and engaging idler sprocket wheels 58, 59 near opposite ends of the member.

A shaft 60 is mounted in bearings in blocks 61 secured to the ends of the sections of the base and, since the sections 31a, 31d in the mechanism illustrated are slightly divergent in relation to sections 31b, 31c, the shaft is made in sections connected by couplings 62. The shaft carries a sprocket wheel 63 connected by a chain 64 to the sprocket wheel 65 on the shaft of a motor 66.

Opposite the sections of the base, the shaft 60 carries sprocket wheels 66a, 66b, 66c, 66d and the sprocket wheels 66a, 66d are smaller than the sprocket wheels 66b, 66c. A shaft 67 is mounted in bearings in blocks 68 on the end of base section 31a remote from shaft 60, and the shaft 67 carries a sprocket wheel 69a of the same size as the sprocket wheel 66a. A shaft 70 is mounted in bearings in blocks 71 attached to the respective ends of base sections 31b, 31c remote from shaft 60 and shaft 70 carries sprocket wheels 69b, 69c aligned with and of the same size as sprocket wheels 66b, 66c, respectively. A shaft 72 is mounted in bearings in blocks 73 attached to the end of base section 31d remote from shaft 60 and carries a sprocket wheel 69d aligned with and of the same size as sprocket wheel 66d. Each carriage is provided with spaced brackets 74 depending from its under surface and a chain is connected at its ends to the brackets and trained about the sprocket wheels of the 66 and 69 series, the chains being designated 75a, 75b, 75c, and 75d, respectively.

In describing the operation of the transfer mechanism, it will be assumed that the plant and machine conveyors, as seen in Fig. 1, advance toward and away from the observer, respectively. The conveyors move in alternation and, in each movement of the plant conveyor, each trolley thereon advances two stations, while, in each movement of the machine conveyor, each arm on the conveyor advances one station.

In the first stage in the cycle of operations of the mechanism, the carriages start to move away from the plant conveyor with carriages 34a, 34b loaded with carriers of raw work taken from adjacent trolleys on the conveyor and carriages 34c, 34d empty. After the carriages have cleared the plant conveyor, that conveyor starts to advance and, during its movement, the carriages complete their movement to the machine conveyor and the carriers on carriages 34a, 34b are deposited on cross-bars 30 on adjacent arms on the machine conveyor. The movement of the plant conveyor, while the carriages are approaching the machine conveyor, causes empty trolleys on the plant conveyor to be placed in alignment with carriages 34c and 34d, while full trolleys are moved into alignment with carriages 34a, 34b.

In the movement of the carriages toward the machine conveyor by the rotation of shaft 60, the carriages 34a and 34d move at the same rate, since the sprocket wheels 66a, 69a, about which chain 75a of carriage 34a is trained, and the sprocket wheels 66d, 69d, about which the chain 75d of carriage 34d is trained, are of the same size. The sprocket wheels 66b, 69b and 66c, 69c, about which the chains 75b and 75c of carriages 34b and 34c, respectively, are trained, are larger than sprocket wheels 66a, etc., and, as a result, the carriages 34b and 34c move faster than carriages 34a, 34d. Also, when the shaft is stopped with the tops of the A-frames on carriages 34a, 34d lying close to the outer cross-bars 30 on the arms 25 of the machine conveyor, the tops of the A-frames on carriages 34b, 34c lie close to the inner cross-bars 30 on the arms.

The carriages 34a, 34b act as a loader for the machine conveyor, while the carriages 34c, 34d serve as an unloader for that conveyor. When the carriages have come to rest adjacent the machine conveyor in the positions described, the motor 40 on each carriage is started by suitable means, such as a limit switch actuated by the movement of the carriage. The motors on carriages 34a, 34b operate to cause the discs 54 on those carriages to rotate counter-clockwise, as seen in the diagram, Fig. 6, while the motors on carriages 34c, 34d cause the discs on those carriages to rotate clockwise. During the travel of the carriages from the plant conveyor toward the machine conveyor, the discs 54 on all the carriages have been at rest with the pins 55 at bottom dead center thereon. The pins on the discs on carriages 34a, 34b have supported article carriers with the outward extensions 19c of the hooks on the carriers resting on the pins, while the pins on carriages 34c and 34d have been inactive. When the carriages come to rest at the end of their paths of travel toward the machine conveyor, the counter-clockwise rotation of discs 54 on carriages 34a, 34b causes the article carriers on those carriages to be raised by the pins 55 and, when the pins have moved through about 270°, the forward ends 19b of the hooks 19 of the carriers engage the ends of the cross-bars 30 on adjacent arms 25 of the machine conveyor. As the rotation of discs 54 continues, the carriers remain suspended on the cross-bars and the discs come to rest with their pins at bottom dead center. When the discs 54 on carriages 34c and 34d are moved clockwise, the pins 55 thereon engage the outward extensions 19c of carriers suspended on cross-bars 30 on adjacent arms 25 of the machine conveyor and, as the pins continue their movement, they raise the carriers free of the cross-bars and finally come to rest at bottom dead center with the carriers suspended therefrom.

When carriers of raw work have been transferred, as described, from carriages 34a, 34b to outer and inner cross-bars 30 on adjacent arms of the plant conveyor and carriages 34c, 34d have removed carriers of processed articles from inner and outer cross-bars on adjacent arms 25, the motor 66 is started and the carriages start to move toward the plant conveyor. While this movement is taking place, the elevator of the plating machine rises to raise the arms 25 thereon, the conveyor advances one step with the arms raised, and the arms are then lowered by the elevator.

When the carriages come to rest at their respective stations on the plant conveyor, the motors 40 on the empty carriages 34a, 34b are started to cause the discs 54 thereon to move counter-clockwise and, in such movement, the pins 55 on the discs engage the outward extensions on the hooks 19 of carriers loaded with raw work, which are suspended from trolleys on the plant conveyor in line with the carriages, and remove the carriers from the trolleys. The discs come to rest with their pins at bottom dead center with the carriers of raw work suspended therefrom. During the rotation of the discs 54 on carriages 34a, 34b, the discs 54 on the loaded carriages 34c, 34d move clockwise. In such movement of the discs, the tails 19a of the hooks of the carriers supported on the pins 55 on the discs engage the end sections 18a of frames 18 on respective trolleys 15 on the plant conveyor. The carriers are thus transferred to the plant conveyor and the discs 54 continue their movement until their pins 55 are at bottom dead center. Upon the completion of the movement of the discs on the four carriages, as described, carriages 34a and 34b have taken carriers of raw work from the plant conveyor and carriages 34c and 34d have transferred carriers of processed articles to the plant conveyor.

During the movement of the carriages toward the plant conveyor, the machine conveyor has advanced one step, so that the arm 25, which was opposite carriage 34b and received a carrier of raw work on its inner cross-bar in the preceding transfer cycle, now lies opposite carriage 34a with its outer cross-bar empty. The arm 25, which was previously opposite carriage 34c and is now empty at both cross-bars, is in alignment with carriage 34b, while the arm 25 previously in line with carriage 34d and having a full inner cross-bar and an empty outer one is in alignment with carriage 34c. The arm 25 previously in line with carriage 34a and now loaded with carriers of raw work on both inner and outer cross-bars has moved away from the loader-unloader, while an arm 25 loaded with carriers of processed articles on both its cross-bars has moved into line with carriage 34d.

When the machine conveyor has advanced a step, as described, the carriages start to move away from the plant conveyor with carriages 34a, 34b loaded with raw work and carriages 34c, 34d empty. The transfer cycle is now completed and it is repeated throughout the operation of the plating machine.

The operation of the transfer mechanism may be controlled by any of the usual means, such as limit switches operated by moving parts, a timer, etc. The clutch-brake devices 41 between the motors 40 and their speed reducing means 42 are employed to insure that the discs 54 on the carriages will be stopped at exact locations and with controllable deceleration varying with different weights of work loads in order to avoid objectionable swinging of the article carriers. Similarly, the use of the devices 41 permits controllable torque to be applied to the shafts 48 carrying discs 54, so that the proper torque may be employed to start the work loads gently and reduce the pendulum effect, regardless of the weight of the loads. For the same reasons, it is desirable to cause the motor 66 to drive the carriages through a speed reducer and clutch-brake device interposed between the motor and shaft 60.

I claim:

1. A transfer mechanism for transferring article carriers between a conveyor advancing pairs of carriers in inner and outer files and a second conveyor advancing the carriers in single file, the conveyors moving stepwise in timed relation in opposite directions and having stations substantially in alignment, which comprises at least one pair of tracks between adjacent stations on one conveyor and corresponding stations on the other, the tracks being of unequal length and extending from points equally spaced from stations on the single file conveyor to points equally spaced, respectively, from carriers in the inner and outer files on the second conveyor at stations of said second conveyor, a pair of carriages movable along respective tracks, means for reciprocating the carriages simultaneously and in the same directions along their tracks with the carriages traversing their respective tracks in the same time interval, and means on each carriage operable to remove a carrier from one conveyor, support the carrier during movement of the carriage, and deposit the carrier upon the other conveyor.

2. The transfer mechanism of claim 1, which includes a second pair of tracks between adjacent stations on one conveyor and corresponding stations on the other, the inner tracks being longer than the outer tracks and extending between the single file conveyor and the inner file on the double file conveyor, while the outer tracks extend between the single file conveyor and the outer file on the double file conveyor, carriages movable on the second pair of tracks, means on each of the carriages on the second pair of tracks for removing a carrier from one conveyor, supporting the carrier during movement of the carriage, and depositing the carrier on the other conveyor, and means for reciprocating the carriages on the second pair of tracks simultaneously with and in the same directions as the carriages on the first pair of tracks, the carriages all traversing their respective paths in the same time interval.

3. The transfer mechanism of claim 1, in which the removing, supporting, and depositing means are driven by a motor through a clutch-brake device controllable as to its torque output.

4. The transfer mechanism of claim 1, in which each carriage includes a base structure mounted to move on a track and having standards rising from the base and spaced to receive a carrier between them, and the means for removing a carrier from one conveyor, supporting the carrier, and depositing the carriage on the second conveyor are mounted on the standards near the upper ends thereof.

5. The transfer mechanism of claim 4, in which the removing, supporting, and depositing means include coaxial shafts mounted on the respective standards and eccentric pins mounted on and parallel to the shafts and said means are operated by a motor on the carriage.

6. The transfer mechanism of claim 1, in which the carriages are connected to chains trained about sprocket wheels of different size on a shaft mounted in fixed bearings adjacent the single file conveyor and the shaft is driven by a motor.

7. The transfer mechanism of claim 6, in which the tracks are mounted on a base and shafts are mounted at opposite ends of the base and carry sprocket wheels, about which the chains connected to the carriages are trained.

References Cited in the file of this patent

UNITED STATES PATENTS

| | | |
|---|---|---|
| 603,751 | Woods et al. | May 10, 1898 |
| 2,309,730 | Hastings, Jr. | Feb. 2, 1943 |
| 2,681,015 | Davis | June 15, 1954 |
| 2,772,797 | Schreck | Dec. 4, 1956 |
| 2,806,577 | Lang | Sept. 17, 1957 |
| 2,807,349 | Hauck | Sept. 24, 1957 |